United States Patent
Seo et al.

(10) Patent No.: US 11,478,734 B2
(45) Date of Patent: Oct. 25, 2022

(54) FILTER MEDIUM, METHOD FOR MANUFACTURING SAME, AND FILTER UNIT COMPRISING SAME

(71) Applicant: AMOGREENTECH CO., LTD., Gimpo-si (KR)

(72) Inventors: In Yong Seo, Seoul (KR); Ui Young Jeong, Incheon (KR)

(73) Assignee: Amogreentech Co., Ltd., Gyeonggi-do (KR)

( * ) Notice: Subject to any disclaimer, the term of this patent is extended or adjusted under 35 U.S.C. 154(b) by 144 days.

(21) Appl. No.: 16/470,199

(22) PCT Filed: Dec. 13, 2017

(86) PCT No.: PCT/KR2017/014621
§ 371 (c)(1),
(2) Date: Jun. 14, 2019

(87) PCT Pub. No.: WO2018/110965
PCT Pub. Date: Jun. 21, 2018

(65) Prior Publication Data
US 2019/0366249 A1  Dec. 5, 2019

(30) Foreign Application Priority Data
Dec. 15, 2016  (KR) .................. 10-2016-0171435

(51) Int. Cl.
*B01D 39/16* (2006.01)
*B01D 63/08* (2006.01)
*B01D 65/02* (2006.01)

(52) U.S. Cl.
CPC ............. *B01D 39/16* (2013.01); *B01D 63/08* (2013.01); *B01D 65/02* (2013.01);
(Continued)

(58) Field of Classification Search
None
See application file for complete search history.

(56) References Cited

U.S. PATENT DOCUMENTS

| 7,083,697 B2 * | 8/2006 | Dao ..................... B01D 39/163 |
| | | 118/200 |
| 2004/0011721 A1 | 1/2004 | Aalto et al. |

(Continued)

FOREIGN PATENT DOCUMENTS

| CA | 2662925 A1 | 1/2009 |
| EP | 2397217 A1 | 12/2011 |

(Continued)

*Primary Examiner* — Jason M Greene
*Assistant Examiner* — Eric J McCullough
(74) *Attorney, Agent, or Firm* — Umberg Zipser LLP; Ryan Dean

(57) ABSTRACT

A filter medium is provided. The filter medium according to an embodiment of the present invention comprises: a first support body having a plurality of pores; a nanofiber web comprising nanofibers disposed on upper and lower sides of the first support body and forming a three dimensional network structure; and a second support body having a plurality of pores interposed between the first support body and the nanofiber web, wherein the nanofiber web is realized as a filter medium that satisfies: (1) an elongation of 25% or more, (2) an air permeability of 0.1 to 2.00 cfm, and 3) porosity of 60%~85%. Accordingly, since the filter medium has a fixed level of mechanical properties of the nanofiber web, the shape, structure deformation, and damage of the filter medium are minimized and a flow path is smoothly secured during a water treatment operation so that the filter medium can have a high flow rate. In addition, since the filter medium of the present invention has a prolonged use life due to excellent durability of the filter medium even at high pressure applied during backwashing, and has excellent filtration efficiency and water permeability, the filter (Continued)

medium can be applied in various ways in various water treatment fields.

10 Claims, 5 Drawing Sheets

(52) U.S. Cl.
CPC .......... *B01D 2239/025* (2013.01); *B01D 2239/0631* (2013.01); *B01D 2239/1233* (2013.01)

(56) References Cited

U.S. PATENT DOCUMENTS

| | | |
|---|---|---|
| 2010/0025892 A1 | 2/2010 | Jones et al. |
| 2010/0096317 A1* | 4/2010 | Morita .............. B01D 71/36 210/321.84 |
| 2013/0118973 A1* | 5/2013 | Seo .............. B01D 29/0093 210/435 |
| 2015/0111019 A1* | 4/2015 | Huang .............. D01D 5/18 428/219 |
| 2016/0136584 A1 | 5/2016 | Hwang et al. |

FOREIGN PATENT DOCUMENTS

| | | | |
|---|---|---|---|
| KR | 10-2008-0060263 | | 7/2008 |
| KR | 10-1423757 B1 | | 8/2014 |
| KR | 20150040692 A | * | 4/2015 |
| KR | 20150040692 A | | 4/2015 |
| KR | 20160071760 A | | 6/2016 |

* cited by examiner

FILTER MEDIUM, METHOD FOR MANUFACTURING SAME, AND FILTER UNIT COMPRISING SAME

TECHNICAL FIELD

The present invention relates to a filter medium, and more particularly, to a filter medium, a method of manufacturing the same, and a filter unit including the same.

BACKGROUND ART

Separation membranes may be classified, according to pore sizes thereof, into a microfilter (MF) membrane, an ultrafiltration (UF) membrane, a nanofiltration (NF) membrane, and a reverse osmosis (RO) membrane.

Although the above separation membranes have differences in purpose and pore size, they are filtration media formed of a fabric, porous polymer filtration media, or have the form of a composite membrane in common.

Some of a variety of foreign substances included in water to be treated may remain in pores of a filter medium with which water treatment is repetitively performed, or an attached layer may be formed on a surface of the filter medium. Here, there is a problem in which foreign substances which remain in the filter medium degrades filtration performance. To solve this, foreign substances, which remain in the filter medium, are generally removed by applying a high pressure to the filter medium in a direction opposite to a path through which the water to be treated flows in, is filtered by, and discharged from the filter medium. However, the high pressure applied while the filter medium is cleaned may cause damage to the filter medium, and a problem of delamination may occur in the case of a filter medium having a multilayer structure.

Meanwhile, when a cartridge including a plurality of filtration media formed of a nanofiber is provided to increase the filtration efficiency of the filtration media formed of a nanofiber, a loss in pressure increases and water permeability is degraded due to an increased thickness of the filtration media. Accordingly, it has been required recently to decrease a size of a filtration medium including a support, which is a significant challenge, and research on a medium capable of providing the above-described mechanical strength while decreasing a size of a filtration medium has been continuously performed.

As a representative method of decreasing a size of a filtration medium, there is a method of decreasing an amount of the nanofiber which forms a filtration medium. However, in this case, water permeability may increase, but a thickness of a nanofiber web is non-uniform such that a back loss occurs easily. Also, as an amount of the nanofiber is relatively reduced, mechanical strength of a nanofiber web is degraded such that stability of the filtration medium may not be secured.

Accordingly, it is urgently needed to develop a filtration medium in which deformation and damage to a shape and structure of the medium are minimized even in a backwashing process, which is performed at high pressure, and a flow path is easily secured so as to provide a certain level or higher of mechanical properties simultaneously with having a high flow rate and a quick treatment speed.

DISCLOSURE

Technical Problem

The present invention is directed to providing a filter medium, which secures a certain level or higher of mechanical properties and has high efficiency and a long life, and a method of manufacturing the same.

The present invention is also directed to providing a filter medium in which deformation and damage to a shape and a structure of the filter medium in a water treatment operation are minimized while simultaneously a flow path is easily secured so as to have a high flow rate and a quick treatment speed, and a method of manufacturing the same.

The present invention is also directed to providing a filter medium having high durability and capable of securing a flow path even at high pressure applied in a backwashing process and minimizing delamination between layers, damage to a membrane, and the like, and a method of manufacturing the same.

The present invention is also directed to providing a flat filter unit and a filter module which are variously applicable to the water treatment field using a filter medium having excellent water permeability and durability.

Technical Solution

One aspect of the present invention provides a filter medium including a first support having a plurality of pores, a nanofiber web disposed on each of the top and bottom of the first support and including a nanofiber which forms a three-dimensional network structure, and a second support interposed between the first support and the nanofiber web and having a plurality of pores. Here, the nanofiber web satisfies following conditions (1) to (3) which includes (1) an elongation rate of 25% or higher, (2) air permeability of 0.1 to 2.00 cfm, and (3) a porosity of 40% to 80%.

The nanofiber web may satisfy the following condition (4) $2 \leq (\text{tensile strength (kgf/mm}^2) \text{ in a longitudinal direction (MD)} \times \text{tensile strength (kgf/mm}^2) \text{ in a transverse direction (TD)}) \leq 25$.

The nanofiber web may have an average pore diameter of 0.1 to 3 μm.

The nanofiber may have an average diameter of 50 to 450 nm.

The nanofiber web may have a basis weight of 5 to 30 g/m$^2$.

The nanofiber may be formed using a spinning solution including a fiber-forming component including a fluorine-based compound.

The fluorine-based compound may include one or more compounds selected from the group consisting of polytetrafluoroethylene (PTFE), a tetrafluoroethylene-perfluoroalkyl vinyl ether (PFA) copolymer, a tetrafluoroethylene-hexafluoropropylene (FEP) copolymer, a tetrafluoroethylene-hexafluoropropylene-perfluoroalkyl vinyl ether (EPE) copolymer, a tetrafluoroethylene-ethylene (ETFE) copolymer, polychlorotrifluoroethylene (PCTFE), a chlorotrifluoroethylene-ethylene (ECTFE) copolymer, and poly(vinylidene fluoride) (PVDF).

The first support may have a thickness of 90% or more of an overall thickness of the filter medium.

The first support may have a basis weight of 250 to 800 g/m$^2$.

The first support may have a thickness of 2 to 8 mm

The first support may include a first composite fiber which includes a support component and a low melting point component and is disposed to expose at least a part of the low melting point component at an outer surface, and the first support and the second supports are bonded through fusion between the low melting point component of the first composite fiber and a low melting point component of a second composite fiber.

The second support may have a basis weight of 35 to 80 g/m² and a thickness of 150 to 250 µm.

The second support may include a second composite fiber which includes a support component and a low melting point component and is disposed to expose at least a part of the low melting point component at an outer surface, and the low melting point component of the second composite fiber is fused with the nanofiber web.

The first support and the second support may be any one of a non-woven fabric, a woven fabric, and a knitted fabric.

Another aspect of the present invention provides a flat filter unit including the filter medium and a support frame including a flow path, through which a filtrate filtered by the filter medium is discharged to the outside, and supporting an edge of the filter medium.

Advantageous Effects

According to the present invention, in a filter medium, since a nanofiber web has a certain level of mechanical properties, deformation and damage to a shape and a structure of the filter medium can be minimized and a flow path can be easily secured so as to have a high flow rate in a water treatment operation.

Also, due to excellent durability of the filter medium at high pressure applied in a backwashing process, the filter medium according to the present invention may have an extended use period simultaneously with excellent filtration efficiency and water permeability so as to be applicable in a variety of water treatment fields.

DESCRIPTION OF DRAWINGS

FIG. 2 is a schematic diagram illustrating the lamination of the filter medium according to one embodiment of the present invention in which FIG. 3 is a view of a flat filter unit according to one embodiment of the present invention in which

BEST MODES

Figure 1:
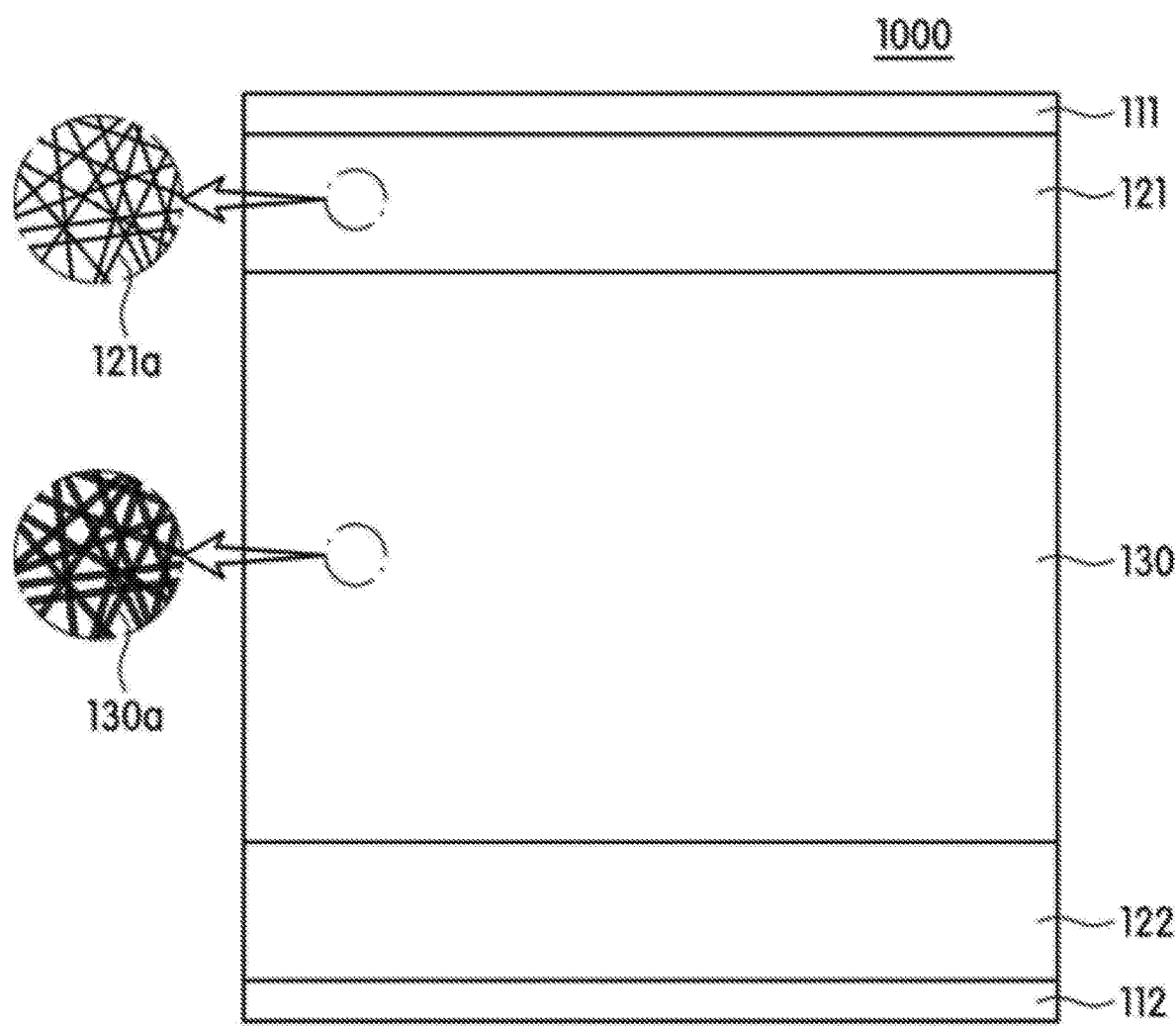
FIG. 1 is a cross-sectional view of a filter medium according to one embodiment of the present invention.

Hereinafter, embodiments of the present invention will be described in detail with reference to the attached drawings so that one of ordinary skill in the art to easily carry out the present invention. The present invention may be embodied in a variety of different shapes and is not limited to the embodiments disclosed herein. In order to clearly describe the present invention, parts irrelevant to the present invention are omitted, and the same or similar components are assigned the same reference numerals throughout the drawings.

Referring to FIG. 1, a filter medium 1000 according to one embodiment of the present invention includes a first support 130 including a plurality of pores, nanofiber webs 111 and 112 disposed above and below the first support 130 and including a nanofiber forming a three-dimensional network structure, and second supports 121 and 122 including a plurality of pores and interposed between the first support 130 and the nanofiber webs 111 and 112, respectively.

First, before describing components included in the filter medium 1000 according to the present invention, a reason why it is necessary that the nanofiber webs 111 and 112 included in the filter medium 1000 satisfy the following conditions will be described.

In general, to improve filtration efficiency, there is a method of decreasing a size of a nanofiber web and including a plurality of such nanofiber webs. Here, to secure the stability of a filter medium including a decreased-sized nanofiber web, the nanofiber web needs a certain level or more of mechanical properties. Since the mechanical properties of the nanofiber web are affected directly/indirectly by mechanical properties of nanofiber which forms the nanofiber web, the filter medium which secures stability may be implemented by adjusting the mechanical properties of the nanofiber.

However, in this case, since the mechanical properties of the nanofiber do not act as independent factors, it is necessary to mutually adjust the mechanical properties of the nanofiber in order to secure optimal stability. For example, both tensile strength, which indicates a force when tension is applied to the nanofiber such that the nanofiber breaks, and an elastic recovery rate, which indicates a percentage of a recovered length with respect to an elongation length of the nanofiber when tension is applied to the nanofiber, are the same in an aspect of a property with respect to a longitudinal direction of the nanofiber. However, since the tensile strength is a property related to brittleness but the elastic recovery rate is a property related to flexibility and elasticity, research on mechanical properties which satisfy both of them is necessary.

Also, the mechanical properties of the nanofiber may have a trade-off relationship in which when any one thereof is satisfied, another is not satisfied. For example, the tensile strength of the above-described overall nanofiber web may have a trade-off relationship with porosity and an average pore diameter of the nanofiber web. Generally, since the tensile strength of a nanofiber web is degraded when a size of a pore diameter is increased or a pore diameter ratio is increased to increase water permeability, it is necessary to adjust the above-described mechanical properties to embody a filter medium which secures stability while providing as much water permeability and filtration efficiency as desired.

Accordingly, the nanofiber webs 111 and 112 included in the filter medium 1000 according to the present invention may satisfy following conditions (1) to (3) and may satisfy a condition (4).

First, as the condition (1), the nanofiber webs 111 and 112 may have an elongation rate equal to or greater than 25%, and preferably, equal to or greater than 30%. When a nanofiber web including the nanofiber is usable as a filter medium like the present invention, the nanofiber web should withstand a pressure of a filtrate and/or a pressure in backwashing and should be prevented from being segmented and damaged due to the pressure so as to maintain a function as a filter. The elongation rate means a percentage of an elongated length of the nanofiber web, in which local contraction does not occur, with respect to an initial length thereof. When the elongation rate of the nanofiber web is less than 25%, the nanofiber web may be easily deformed or segmented and damaged by a pressure of a filtrate and/or backwashing such that it is impossible to secure the durability and stability of the nanofiber web and there is a risk of a service life being degraded. However, when the elongation rate is excessively high, since mechanical strength may be degraded by the elongation of the nanofiber web, it is necessary to select an adequate elongation rate in consideration of a target filtrate, a size and pores of the filter medium, and the like.

Next, as the condition (2), the nanofiber webs 111 and 112 may have an air permeability of 0.1 to 2.00 cfm, and preferably, 0.3 to 1.8 cfm. In general filter fields, air permeability may be improved by forming a filter medium using fiber having a small thickness or uniformly arranging the fiber longitudinally and transversely. However, in the case of using the filter medium including the nanofiber according to the present invention, when a dense nanofiber web is designed to secure a certain level or higher of air permeability, mechanical strength may be degraded by rigidity of the nanofiber. Accordingly, it is necessary to design the nanofiber web to have a certain level of mechanical strength in consideration of a purpose, size, and type of the filter medium according to the present invention. When an air permeability of the nanofiber web is less than 0.1 cfm, the nanofiber web may have high mechanical strength, but water permeability thereof may be reduced due to the small air permeability. When the air permeability exceeds 2 cfm, filtration efficiency may be reduced and a problem may occur in backwashing due to the high air permeability. Also, a risk of collapse of the nanofiber web caused by the pressure of the filtrate and/or backwashing is present.

Next, as the condition (3), the nanofiber webs 111 and 112 may have a porosity equal to or greater than 40% to 80%, and preferably, 60% to 80%. When the porosity of the nanofiber web is less than 40%, since the porosity decreases such that a pressure received by the nanofiber web during filtration and/or backwashing increases, mechanical deformation of the nanofiber web may be caused. Also, the density of the nanofiber which forms the nanofiber web increases such that water permeability may be degraded. When the porosity exceeds 85%, filtration efficiency and durability in backwashing may be degraded.

Next, as the condition (4), the nanofiber webs 111 and 112 may satisfy 2≤(tensile strength ($kgf/mm^2$) in a longitudinal direction (MD)×tensile strength ($kgf/mm^2$) in a transverse direction (TD))≤25, and preferably may satisfy 3≤(tensile strength ($kgf/mm^2$) in a longitudinal direction (MD)×tensile strength ($kgf/mm^2$) in a transverse direction (TD))≤20. The tensile strength in the direction MD means tensile strength of the nanofiber web with respect to a direction in which the nanofiber is spun and discharges, and the direction TD means a direction perpendicular to the transverse direction, that is, the direction in which the nanofiber is spun and discharged. When a value obtained by multiplying the tensile strength in the longitudinal direction by the tensile strength in the transverse direction is less than 2, the nanofiber web may not withstand a pressure in backwashing and may be bent or the nanofiber which forms the nanofiber web may be segmented. When the value exceeds 10, due to excessive tensile strength of the nanofiber web, durability in backwashing may not be high and mechanical deformation caused by a filtrate may occur.

As described above, the nanofiber web satisfies the above-described tensile strength, elongation rate, porosity, and air permeability such that a certain level or higher of mechanical strength of the nanofiber web is maintained to secure stability and durability. Also, when a cartridge type filter medium including a plurality of such nanofiber webs is implemented in order to increase the filtration efficiency of the filter medium including the nanofiber web, due to the nanofiber web satisfying the above properties, mechanical strength may be prevented from being degraded by a decreased size while simultaneously a pressure loss may be prevented and filtration efficiency may be improved such that the cartridge type filter medium is applicable to a variety of filter fields including the water treatment filter field.

Next, the nanofiber which forms the nanofiber webs 111 and 112 may be formed of a well-known fiber-forming component. However, preferably, a fluorine-based compound may be included as the fiber-forming component to provide excellent chemical resistance and heat resistance. Through this, although water to be treated is a strong acid/strong alkali solution or a high-temperature solution, filtration efficiency/flow rate at a target level and a long use period may be provided without a change in properties of the filter medium. As the fluorine-based compound, any one of well-known fluorine-based compounds capable of being manufactured as nanofiber may be used without limitation, and for example, may include one or more compounds selected from the group consisting of polytetrafluoroethylene (PTFE), a tetrafluoroethylene-perfluoroalkyl vinyl ether (PFA) copolymer, a tetrafluoroethylene-hexafluoropropylene (FEP) copolymer, a tetrafluoroethylene-hexafluoropropylene-perfluoroalkyl vinyl ether (EPE) copolymer, a tetrafluoroethylene-ethylene (ETFE) copolymer, polychlorotrifluoroethylene (PCTFE), a chlorotrifluoroethylene-ethylene (ECTFE) copolymer, and poly(vinylidene fluoride) (PVDF). More preferably, in terms of a low manufacturing cost, easily mass-producing nanofiber by electrospinning, excellent mechanical strength, and chemical resistance, the fluorine-based compound may be PVDF. Here, when the nanofiber includes PVDF as a fiber-forming component, a weight average molecular weight of the PVDF may be 10,000 to 1,000,000, and preferably, 300,000 to 600,000, but is not limited thereto.

The nanofiber may have an average diameter of 50 to 450 nm, and preferably, 150 to 400 nm. For example, the nanofiber may have an average diameter of 300 μm. When the average diameter of the nanofiber is less than 50 nm, porosity and permeability may be degraded. When the average diameter is more than 450 nm, filtration efficiency may be reduced and tensile strength may be reduced.

Also, a thickness of the nanofiber webs 111 and 112 may be 0.5 to 200 μm, and for example, 20 μm, but may be appropriately changed in consideration of desirable water permeability and filtration efficiency, accordingly, that the present invention is not particularly limited thereto.

Also, basis weights of the nanofiber webs 111 and 112 may be 5 to 30 $g/m^2$, preferably, 7 to 20 $g/m^2$, and for example, 10 $g/m^2$. When the basis weight of the nanofiber web is less than 5 $g/m^2$, tensile strength and an elongation rate are degraded such that the nanofiber web is easily deformed, segmented, and damaged by pressure of a filtrate and/or backwashing. Accordingly, it is impossible to secure the durability and stability of the nanofiber web, and a service life and filtration efficiency thereof may be reduced. Also, when the basis weight of the nanofiber web is less than 30 $g/m^2$, water permeability may be reduced and durability in backwashing may not be high.

Also, the nanofiber webs 111 and 112 may have an average pore diameter of 0.1 to 3 μm, and preferably, may be 0.15 to 2 μm. When the average pore diameter of the nanofiber webs 111 and 112 is less than 0.1 μm, water permeability with respect to a solution to be filtered may be degraded. When the average diameter exceeds 3 μm, filtration efficiency with respect to contaminants may not be high.

Also, one or more layers of the nanofiber webs 111 and 112 may be included in the filter medium 1000. Here, porosity, a pore diameter, a basis weight, a thickness, and/or the like of each nanofiber web may be different.

Hereinafter, other components included in the filter medium 1000 will be described in detail.

First, the first support 130 supports the filter medium 1000 and forms a large flow path to more smoothly perform a filtration process or a backwashing process. In detail, when a pressure gradient is formed such that an internal pressure of the filter medium is lower than an external pressure thereof during the filtration process, the filter medium may be compressed. In this case, a flow path through which the filtrate is flowable in the filter medium may be significantly reduced or blocked such that a higher differential pressure may be applied to the filter medium while simultaneously a flow rate may be significantly degraded. Also, an external force for expansion from the inside of the filter medium toward the outside in both directions may be applied during the backwashing process. When mechanical strength is low, the filter medium may be damaged by the applied external force.

The first support 130 may be provided to prevent the above problems which occur during the filtration process and/or the backwashing process, may be used in the water treatment field, and may be a well-known porous member which secures mechanical strength. For example, the first support may be a non-woven fabric, a woven fabric, or knitted fabric.

The woven fabric refers to fabric including fibers oriented in longitudinal and transverse directions. Specific structures may be plain weaves, twilled weaves, and the like, and densities of weft and warp are not particularly limited. Also, the knitted fabric may be a well-known knitted structure, may be a weft-knitted fabric, a warp-knitted fabric, and the like, and for example, may be tricot in which threads are warp-knitted. Also, as shown in FIG. 1, the first support 130 means the non-woven fabric in which fibers included therein are not oriented in longitudinal and transverse directions. A dry non-woven fabric such as a chemical-bonded non-woven fabric, a thermal-bonded non-woven fabric, an aerated non-woven fabric, and the like, a wet non-woven fabric, a spanless non-woven fabric, a well-known non-woven fabric manufactured using a variety of methods such as a needle-punched non-woven fabric and a melt-blown fabric may be used.

The first support 130 may occupy 90% or more of an overall thickness of the filter medium to provide adequate mechanical strength and to prevent durability from being degraded due to backwashing. As an example, a thickness of the first support 130 may be 2 to 8 mm, preferably, 2 to 5 mm, and more preferably, 3 to 5 mm. For example, the first support 130 may have a thickness of 5 mm. When the thickness is less than 2 mm, adequate mechanical strength capable of withstanding frequent backwashing may not be provided. Also, in the case of a thickness more than 8 mm, when the filter medium is provided as a filter unit, which will be described below, and then a plurality of such filter units are provided as a filter module having a limited space, a degree of integration of the filter medium per unit volume of the module may be reduced.

Preferably, the first support 130 may satisfy the thickness condition while simultaneously a basis weight thereof may be 250 to 800 g/m$^2$, and more preferably, 350 to 600 g/m$^2$. For example, the first support 130 may have a basis weight of 500 g/m$^2$. When the basis weight is less than 250 g/m$^2$, it may be difficult to provide adequate mechanical strength and adhesion with the second support may be reduced. When the basis weight exceeds 800 g/m$^2$, an adequate flow path may not be formed and a flow rate may be reduced such that it may be difficult to smoothly perform backwashing due to an increase in differential pressure.

Also, when the first support 130 is formed of fiber such as a non-woven fabric, an average diameter of the fiber may be 5 to 50 μm, and preferably, 20 to 50 μm. For example, the average diameter of the fiber may be 35 μm. Also, the average pore diameter of the first support 130 may be 20 to 200 μm, and preferably, 30 to 180 μm. As an example, the average pore diameter of the first support 130 may be 100 μm. Porosity thereof may be 50 to 90%, and preferably, 55 to 85%. For example, the first support 130 may have a porosity of 70%, but is not limited thereto. Any porosity and pore diameter capable of providing a target level of mechanical strength while simultaneously easily forming a flow path even at high pressure by supporting the above-described nanofiber webs 111 and 112 during the filtration process and/or the backwashing process are usable.

As the first support 130, any material, which is usable as a support of a separation membrane, may be used without limitation. As a non-limiting example thereof, a synthetic polymer component selected from the group consisting of polyester, polyurethane, a polyolefin, and polyamide or a natural polymer component including cellulose may be used. However, when the first support has strong brittleness, it may be difficult to provide a target level of adhesion in a process of laminating the first support with the second support. This is because the first support does not have a smooth surface like a film and may have an uneven surface having porosity. The surface formed by fibers such as a non-woven fabric may have an unsmooth surface according to an arrangement of fibers, denier of fibers, and the like, and a degree thereof may be different for each position. When a part, in which two laminated layers are not in close contact with each other at an interface between two laminated layers, is present and other parts are joined, delamination between layers may begin due to the part which is not in close contact. To solve this, it is necessary to perform a lamination process while an adhesion degree of the two layers is increased by applying pressures to the two layers from both sides. However, in the case of a support having high brittleness, even when a pressure is applied, there is a limit in increasing adhesion of an interface between two laminated layers. Since the support may be damaged when a higher pressure is applied, a material having high flexibility and a high elongation rate may be suitable as a material of the first support. Preferably, the first support 130 may have a polyolefin material to have excellent adhesion with the second supports 121 and 122.

Meanwhile, the first support 130 may include a low melting point component to be bonded to both the second supports 121 and 122 without an additional adhesive or adhesive layer. When the first support 130 is whole cloth such as a non-woven fabric, the first support may be manufactured using a first composite fiber 130a including a low melting point component. The first composite fiber 130a may include a support component and a low melting point component and may be disposed such that at least a part of the low melting point component is exposed at an outer surface. As an example, the first composite fiber may be a sheath-core type composite fiber, in which the support component forms a core portion and the low melting point component surrounds the core portion, or may be a side-by-side composite fiber in which the low melting point component is disposed on one side of the support component. As described above, in terms of flexibility and an elongation rate of the support, the low melting point component and the support component may be a polyolefin. For example, the support component may be polypropylene and the low melting point component may be polyethylene. Here, a melting point of the low melting point component may be 60 to 180□.

Next, the second supports 121 and 122, which are disposed on both sides of the first support 130 and the nanofiber webs 111 and 112, will be described.

The second supports 121 and 122 support the above-described nanofiber webs 111 and 112 and increase adhesion of layers provided in the filter medium.

The second supports 121 and 122 are not particularly limited as long as they can serve as supports of the filter medium, and may preferably be in the form of a woven fabric, a knitted fabric, or a non-woven fabric. The woven fabric refers to fabric including fibers oriented in longitudinal and transverse directions. Specific structures may be plain weaves, twilled weaves, and the like, and densities of weft and warp are not particularly limited. Also, the knitted fabric may be a well-known knitted structure and may be a weft knitted fabric, a warp knitted fabric, and the like, but is not limited particularly. Also, the non-woven fabric means that fibers included therein are not oriented in longitudinal and transverse directions. A dry non-woven fabric such as a chemical-bonded non-woven fabric, a thermal-bonded non-woven fabric, an aerated non-woven fabric, and the like, a wet non-woven fabric, a spanless non-woven fabric, a well-known non-woven fabric manufactured using a variety of methods such as a needle-punched non-woven fabric and a melt-blown fabric may be used.

The second supports 121 and 122 may be, for example, a non-woven fabric. Here, fibers which form the second supports 121 and 122 may have an average diameter of 5 to 30 µm. A thickness of the second supports 121 and 122 may be 150 to 250 µm, preferably, 160 to 240 µm, and for example, 200 µm.

Also, the second supports 121 and 122 may have an average pore diameter of 20 to 100 µm and a porosity of 50 to 90%. However, the second supports are not limited thereto, and any porosity and pore diameter capable of providing a target level of mechanical strength by supporting the above-described nanofiber webs 111 and 112 and simultaneously not impeding a flow of a filtrate which flows through the nanofiber webs 111 and 112 may be used without limitation. As an example, the second supports 121 and 122 may have an average pore diameter of 60 µm and a porosity of 70%.

Also, the basis weight of the second supports 121 and 122 may be 35 to 80 g/m$^2$, more preferably, 40 to 75 g/m$^2$, and for example, 40 g/m$^2$. When the basis weight is less than 35 g/m$^2$, an amount of fibers which form the second supports and are distributed on an interface with the nanofiber webs 111 and 112 may be small such that an effective adhesion area of the second supports in contact with the nanofiber webs is reduced and a target level of adhesion may not be provided. Also, problems may be present in which adequate mechanical strength capable of supporting the nanofiber webs is not provided and adhesion with the first support is reduced. Also, when the basis weight exceeds 80 g/m$^2$, it may be difficult to secure a target flow rate and difficult to perform smooth backwashing due to an increase in a differential pressure.

As the second supports 121 and 122, any material, which is usable as a support of the filter medium, may be used without limitation. As a non-limiting example thereof, a synthetic polymer component selected from the group consisting of polyester, polyurethane, a polyolefin, and polyamide, or a natural polymer component including cellulose may be used.

However, the second supports 121 and 122 may be a polyolefin polymer component to improve adhesion between the above-described nanofiber webs 111 and 112 and the first support 130. Also, when the second supports 121 and 122 are whole cloth such as a non-woven fabric, the second supports may be manufactured using a second composite fiber 121a including a low melting point component. The second composite fiber 121a may include a support component and a low melting point component and may be disposed such that at least a part of the low melting point component is exposed at an outer surface. As an example, the second composite fiber may be a sheath-core type composite fiber, in which the support component forms a core portion and the low melting point component surrounds the core portion, or may be a side-by-side composite fiber in which the low melting point component is disposed on one side of the support component. As described above, in terms of flexibility and an elongation rate of the support, the low melting point component and the support component may be a polyolefin. For example, the support component may be polypropylene and the low melting point component may be polyethylene. Here, a melting point of the low melting point component may be 60 to 180□.

When the above-described first support 130 is implemented using the first composite fiber 130a including the low melting point component to provide a more improved adhesive force with the second supports 121 and 122, a more strongly fused portion caused by fusion of the low melting point component of the first composite fiber 130a and the low melting point component of the second composite fiber 121a may be formed at an interface between the first support 130 and the second support 121. Here, the first composite fiber 130a and the second composite fiber 121a may be made of the same type of material in terms of compatibility.

Meanwhile, in the filter medium 1000 according to one embodiment of the present invention, the first support 130 and the nanofiber webs 111 and 112 do not face each other directly and the second supports 121 and 122 having a smaller thickness are interposed therebetween in order to more stably and easily perform an attachment process, to provide a significantly excellent adhesive force, and to minimize separation and delamination between layers even when a high external force is applied due to backwashing and the like.

Figure 2A:
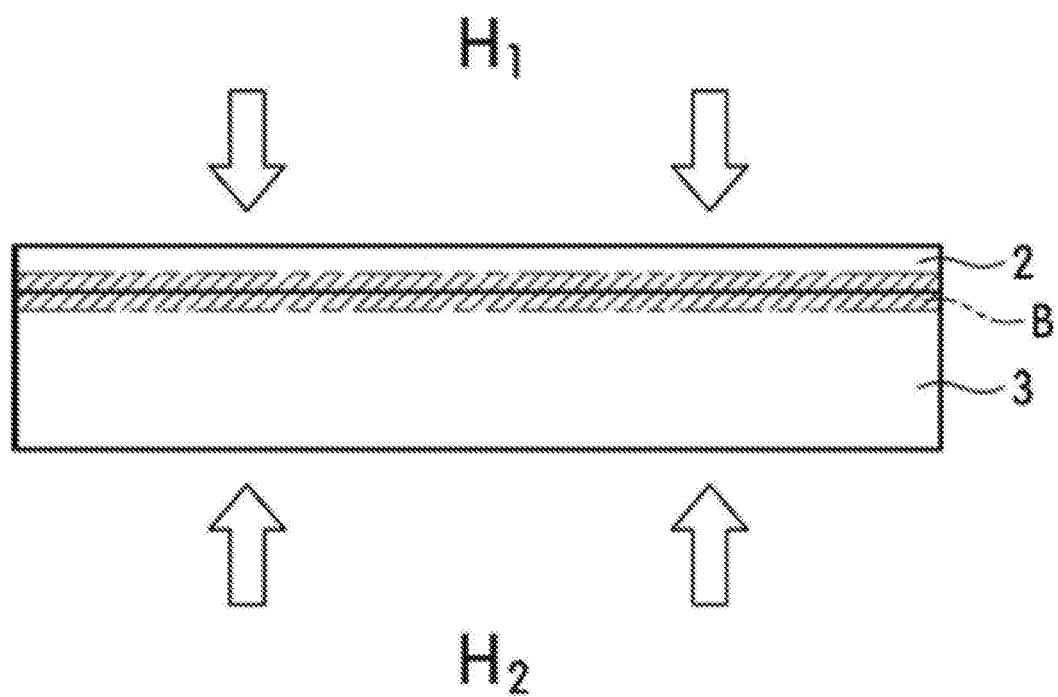
FIG. 2A is a view illustrating the lamination of a nanofiber web with a second support.
Figure 2B:
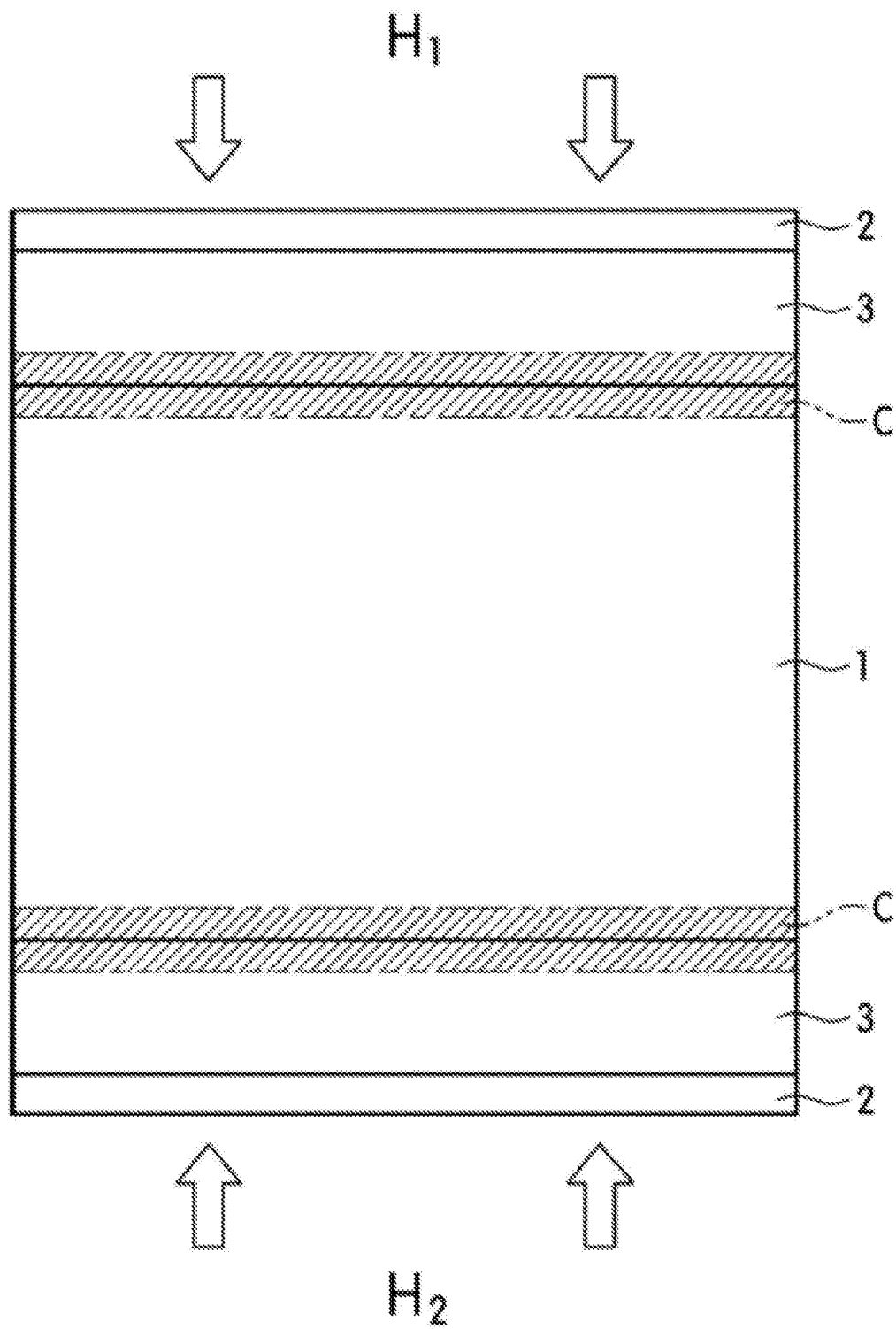
FIG. 2B is a view illustrating lamination performed by arranging the nanofiber web and second support, which are laminated, on each of both sides of a first support.

Referring to FIG. 2A, since a difference between thicknesses of a nanofiber web 2 and a second support 3, which occupies less than 10% of an overall thickness of a filter medium, is significantly smaller than a difference between thicknesses of the nanofiber web 2 and a first support 1, heat H1 and H2 applied from above and below the laminated nanofiber web 2/the second support 3 arrive at an interface therebetween such that a fusion portion B is easily formed. Also, since it is easy to adjust an amount and time of applied heat, it is advantageous for preventing the physical/chemical deformation of the nanofiber web 2. Accordingly, when the nanofiber web 2 is bonded to the second support 3 as shown in FIG. 2A, nanofibers may be bonded to the support with excellent adhesion as shown in FIG. 2B without a change in properties of the initially designed nanofiber web 2.

The above-described filter medium 1000 may be manufactured using the following method, but is not limited thereto.

The filter medium 1000 according to the present invention may be manufactured through operations including (1) laminating a nanofiber web with a second support and (2) disposing and laminating the nanofiber web and the second support, which are laminated, on each of both sides of a first support such that the second support comes into contact with the first support.

First, the operation (1) of laminating the nanofiber web with the second support will be described.

The nanofiber web may be formed using any method of forming a three-dimensional network-shaped fiber web using nanofibers without limitation. Preferably, the nanofiber web may be formed by electrospinning a spinning solution including a fluorine-based compound onto the second support.

The spinning solution may include, for example, a fluorine-based compound and a solvent as fiber-forming components. 5 to 30 wt %, and preferably, 8 to 20 wt % of the fluorine-based compound may be included in the spinning solution. As an example, 15 wt % of the fluorine-based compound may be included in the spinning solution. When the fluorine-based compound is less than 5 wt %, it is difficult to form a fiber. When being spun, the fluorine-based compound is not spun in a fiber shape and is sprayed in a droplet state to form a film shape. Otherwise, even when spinning is performed, a lot of beads are formed and the solvent is not volatilized well such that a phenomenon in which pores are blocked during a calendering process which will be described below may occur. Also, when the fluorine-based compound exceeds 30 wt %, viscosity increases and solidification occurs on a surface of the solution such that it is difficult to perform spinning for a long time, and a diameter of fibers increases such that it is impossible to form a fiber shape having a size of submicrometer.

As the solvent, any solvent, which does not generate a precipitation while dissolving the fluorine-based compound which is a fiber-forming component and does not influence a spinning property of nanofibers, which will be described below, may be used without limitation. Preferably, any one or more selected from the group consisting of r-butyrolactone, cyclohexanone, 3-hexanone, 3-heptanone, 3-octanone, N-methylpyrrolidone, dimethylacetamide, acetone dimethyl sulfoxide, and dimethylformamide may be included. As an example, the solvent may be a mixed solvent of dimethylacetamide and acetone.

The manufactured spinning solution may be manufactured as a nanofiber through any one of well-known electrospinning devices and methods. As an example, as the electrospinning device, an electrospinning device including a single spinning pack including one spinning nozzle may be used or an electrospinning device including a plurality of single spinning packs or a spinning pack including a plurality of nozzles may be used for mass production. Also, as an electrospinning method, dry-spinning or wet-spinning including an external coagulating tub may be used without limitation.

When an agitated spinning solution is injected into the electrospinning device and electrospun on a collector such as paper, a nanofiber web formed of a nanofiber may be yielded. As an example of a specific condition for the electrospinning, an air pressure of air spray of an air spray nozzle provided in a nozzle of the spinning pack may be set within a range of 0.01 to 0.2 MPa. When the air pressure is less than 0.01 MPa, there is no effect on collection and accumulation. When 0.2 MPa is exceeded, a phenomenon, in which a cone of a spinning nozzle is solidified such that a needle is blocked, occurs such that trouble may occur in spinning. Also, when the spinning solution is spun, an injection speed of the spinning solution per nozzle may be 10 to 30 µl/min. Also, a distance between a tip of the nozzle and the collector may be 10 to 30 cm. However, the distance is not limited thereto and may be modified according to purpose.

Also, the nanofiber web may be formed directly on the above-described second support by electrospinning the nanofiber directly on the second support. The nanofiber accumulated/collected on the second support has a three-dimensional network structure and may be implemented as the nanofiber web having a three-dimensional network structure by further applying heat and/or pressure to the accumulated/collected nanofiber to retain porosity, a pore diameter, and a basis weight, which are adequate for realizing desirable water permeability and filtration efficiency of a separation membrane. A specific method of applying heat and/or pressure may be selected from well-known methods. As a non-limiting example, a general calendering process may be used in which a temperature of applied heat may be 70 to 190□. Also, when the calendering process is performed, the process may be divided into several cycles and performed a plurality of times. For example, a drying process for removing a part or an entirety of a solvent and water remaining in the nanofiber may be performed through primary calendering and then secondary calendering may be performed to adjust pores and to improve strength. Here, degree(s) of heat and/or pressure, which are/is applied in the calendering processes, may be equal or different.

When the second support is implemented using a low melting point composite fiber, bonding between the nanofiber web and the second support through heat fusion may be performed at the same time through the calendering process.

Also, an additional hot-melt powder or hot-melt web may be further interposed to bond the second support to the nanofiber web. Here, a temperature of applied heat may be 60 to 190□ and an applied pressure may be 0.1 to 10 kgf/cm², but they are not limited thereto. However, components such as the hot-melt powder, which are separately added for bonding, generate fumes or are melted in a process of laminating supports or laminating a support with nanofiber and block pores frequently such that it is not possible to achieve a flow rate of the initially designed filter medium. Also, since the components are soluble in a water treatment process such that environmentally adverse problems may be caused, preferably, the second support and the nanofiber web may be bonded to each other without the components.

Next, before the operation (2) which will be described below, an operation of forming a hydrophilic coating layer by treating the nanofiber web with a hydrophilic coating layer-forming composition may be performed.

In detail, the operation may be performed including treating the nanofiber web with the hydrophilic coating layer-forming composition and forming the hydrophilic coating layer by thermally treating the hydrophilic coating layer-forming composition.

First, the hydrophilic coating layer-forming composition may include a hydrophilic component and a crosslinking component, and for example, include polyvinyl alcohol (PVA), a crosslinking agent including a carboxyl group, and a solvent dissolving the same, for example, water. The hydrophilic coating layer-forming composition may include 2 to 20 parts by weight of the crosslinking agent and 1,000 to 100,000 parts by weight of the solvent with respect to 100 parts by weight of PVA.

Meanwhile, when the nanofiber, which forms the manufactured nanofiber web, includes a fluorine-based compound, due to strong hydrophobicity, a coating layer may not be properly formed on the surface even when being treated with the above-described hydrophilic coating layer-forming composition. Accordingly, the hydrophilic coating layer-forming composition may further include a wettability enhancer in order to well saturate the outer surface of the nanofiber with the hydrophilic coating layer-forming composition.

As the wettability enhancer, any one of components capable of improving the wettability of the outer surface of the hydrophobic nanofiber with respect to a hydrophilic solution and being soluble in the hydrophilic coating layer-forming composition may be used without limitation. As an example, the wettability enhancer may be one or more components selected from the group consisting of isopropyl alcohol, ethyl alcohol, and methyl alcohol. Also, the wettability enhancer may be included 1,000 to 100,000 parts by weight with respect to 100 parts by weight of PVA included in the hydrophilic coating layer-forming composition. When the wettability enhancer is included at less than 1000 parts by weight, wettability of the nanofiber is improved insignificantly such that the hydrophilic coating layer may not be easily formed and the hydrophilic coating layer may be frequently delaminated. Also, when the wettability enhancer is included at more than 100,000 parts by weight, the wettability may be insignificantly improved and concentrations of PVA and the crosslinking agent included in the hydrophilic coating layer-forming composition are decreased such that the hydrophilic coating layer may not be easily formed.

Meanwhile, the hydrophilic coating layer may be formed by pretreating the nanofiber web with the wettability enhancer and then treating the nanofiber web with the hydrophilic coating layer-forming composition while the hydrophilic coating layer-forming composition does not include the wettability enhancer. However, when the nanofiber web is immersed in the hydrophilic coating layer-forming composition while the wettability enhancer is held in the pores, the wettability enhancer held by the pores discharges from the nanofiber web, and at the same time, the time required for the hydrophilic coating layer-forming composition to permeate into the pores increases such that manufacturing time increases. Also, since a degree of permeation of the hydrophilic coating layer-forming composition varies according to a thickness of the nanofiber web and a diameter of the pores, the hydrophilic coating layer may be non-uniformly formed according to the position of the fiber web. In addition, as the hydrophilic coating layer is non-uniformly formed, some pores at a part of the nanofiber web are blocked by the hydrophilic coating layer. In this case, since an initially designed pore structure of the nanofiber web changes, a desirable flow rate may not be obtained. Accordingly, the hydrophilic coating layer-forming composition, which includes the wettability enhancer, is beneficial for reducing a manufacturing time, simplifying a manufacturing process, and improving the formability of the hydrophilic coating layer at the same time without a change in a pore structure of the nanofiber web.

As a method of forming the above-described hydrophilic coating layer-forming composition on the nanofiber web, any one of well-known coating methods may be employed without limitation. For example, immersion, spraying methods, and the like may be used.

Afterwards, an operation of forming the hydrophilic coating layer on the nanofiber web by thermally treating the hydrophilic coating layer-forming composition may be performed. Through the thermal treatment, a process of drying the solvent in the hydrophilic coating layer-forming composition may be performed at the same time. The thermal treatment may be performed by a dryer. Here, a temperature of applied heat may be 80 to 160□ and a treatment time may be 1 to 60 minutes, but they are not limited thereto.

Next, as the operation (2) according to the present invention, an operation of disposing and laminating the nanofiber web and the second support, which are laminated, on each of both sides of the first support such that the second support, which is laminated with the nanofiber web, comes into contact with the first support is performed.

The operation (2) may be performed through operations including (2-1) laminating the second support and the nanofiber webs which are laminated in the operation (1) and (2-2) fusing the first support and the second support by applying any one or more of heat and pressure.

In the operation (2-2), a specific method of applying heat and/or pressure may be selected from well-known methods. As a non-limiting example, a general calendering process may be used in which a temperature of applied heat may be 70 to 190□. Also, when the calendering process is performed, the process may be divided into several cycles and be performed a plurality of times. For example, secondary calendering may be performed after primary calendering. Here, degree(s) of heat and/or pressure, which are/is applied in the calendering processes, may be equal or different. Bonding between the second support and the first support through heat fusion may be performed through the operation (2-2) such that an additional adhesive or an adhesive layer may be omitted.

Meanwhile, the present invention provides a flat filter unit which includes a filter medium manufactured using the above-described manufacturing method.

Figure 3A:
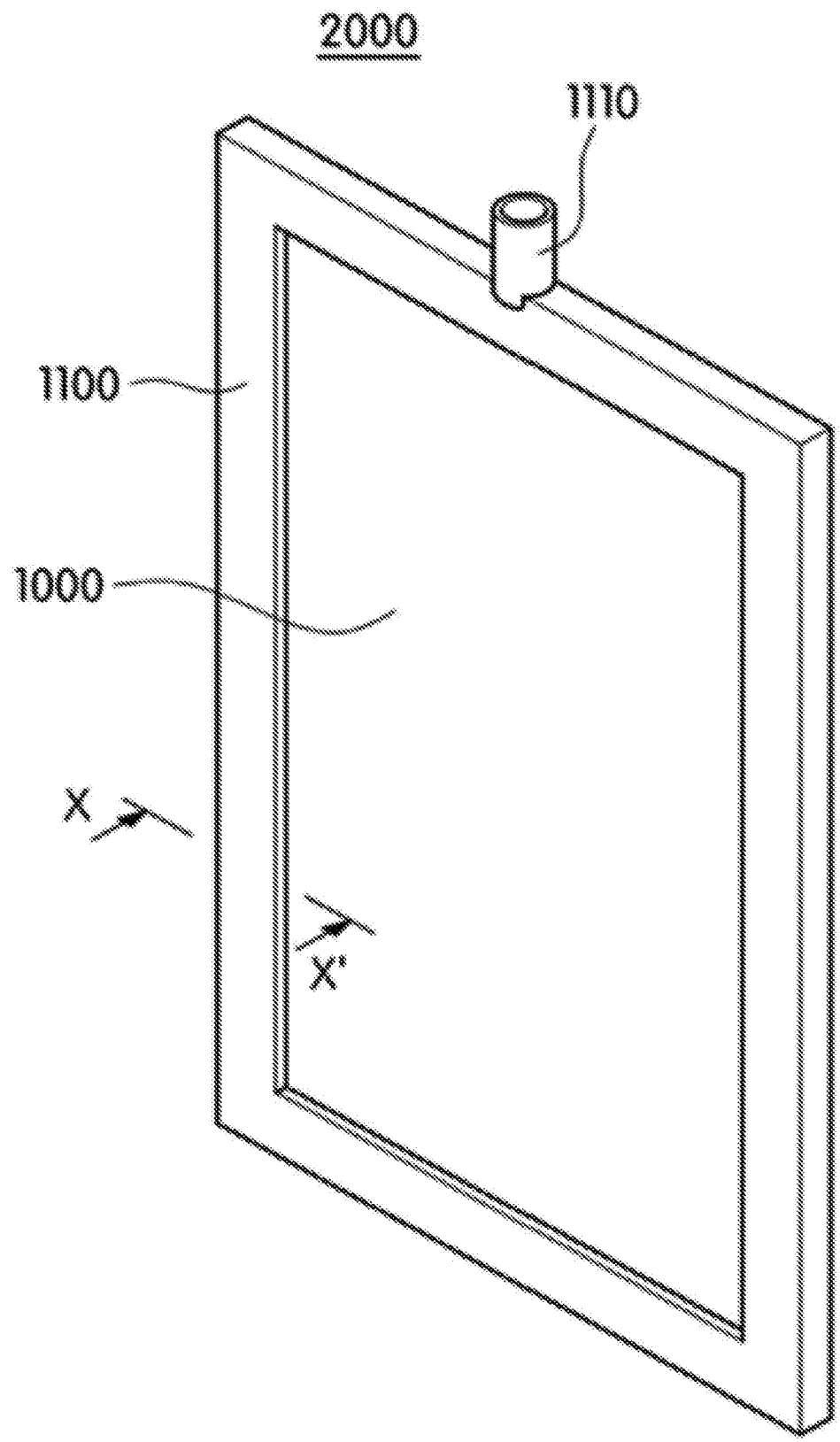
FIG. 3A is a perspective view of the filter unit.

As shown in FIG. 3A, the filter medium 1000 may be implemented as a flat filter unit 2000. In detail, the flat filter unit 2000 includes the filter medium 1000 and a support frame 1100 which includes a flow path for discharging a filtrate filtered by the filter medium 1000 to the outside and supports an edge of the filter medium 1000. Also, an inlet port 1110 which forms a pressure difference (gradient) between the outside and the inside of the filter medium 1000 may be provided in any one area of the support frame 1100. Also, a flow path through which the filtrate filtered by the nanofiber webs passes through a support in which the second support and the first support are laminated in the filter medium 1000 and is discharged to the outside may be formed in the support frame 1100.

Figure 3B:
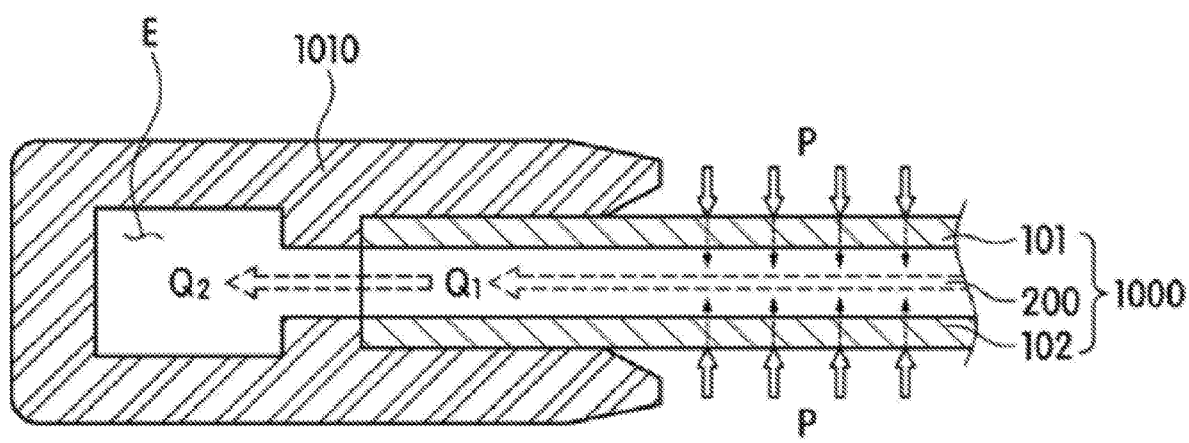
FIG. 3B is a schematic diagram illustrating a filtration flow on the basis of a cross-sectional view taken along a line X-X' of FIG. 3A.

In more detail, in the filter unit 2000 as shown in FIG. 3B, when a suction force at high pressure is applied through the inlet port 1110, a solution P to be treated, which is disposed outside the filter medium 1000, may move toward the inside of the filter medium 1000, a filtrate Q1 filtered through nanofiber webs 101 and 102, may flow along a flow path formed through a support 200, in which the second support and the first support are laminated, and may flow into a flow path E provided in the support frame 1100, and an inflow filtrate Q2 may be discharged to the outside through the inlet port 1110.

Also, the flat filter unit 2000 as shown in FIG. 3A may embody a filter module in which a plurality of such flat filter units are spaced at certain intervals apart in one external case. Also, a plurality of such filter modules may be laminated/blocked to form a large water treatment apparatus.

In the filter medium according to the present invention, since a nanofiber web has a certain level of mechanical properties, deformation and damage to a shape and a structure of the filter medium may be minimized and a flow path may be easily secured so as to have a high flow rate in a water treatment operation. Also, due to excellent durability of the filter medium at high pressure applied in a backwashing process, the filter medium may have an extended use period simultaneously with excellent filtration efficiency and water permeability so as to be applicable in a variety of water treatment fields.

Modes of the Invention

Although following embodiments of the present invention will be described in more detail, the following embodiments do not limit the scope of the present invention and should be construed as aiding the understanding of the present invention.

Example 1

First, to prepare a spinning solution, a mixed solution was manufactured by dissolving 12 g of polyvinylidene fluoride (Arkema Co., Ltd, Kynar761), as a fiber-forming component, in 88 g of a mixed solvent, in which dimethylacetamide and acetone were mixed at a weight ratio of 70:30, at a temperature of 80□ for six hours using a magnetic bar. The spinning solution was injected into a solution tank of an electrospinning device and was discharged at a speed of 15 μl/min/hole. Here, in a spinning section, a temperature of 30□, a humidity of 50%, and a distance of 20 cm between a collector and a spinning nozzle tip were maintained. Afterwards, a fiber web formed of a PVDF nanofiber was manufactured by applying a voltage of 40 kV or higher to a spinning nozzle pack using a high voltage generator while simultaneously applying an air pressure of 0.03 MPa per a nozzle of the spinning nozzle pack. The manufactured nanofiber web had a basis weight of 10 g/m$^2$ and an average pore diameter of 0.8 μm, and the nanofiber had an average diameter of 300 nm.

Also, to form a hydrophilic coating layer on an outer surface of the nanofiber, a first mixed solution was prepared by dissolving 7143 parts by weight of deionized water, as a solvent, with respect to 100 parts by weight of polyvinyl alcohol (Kuraray Co., Ltd, PVA217), as a hydrophilic polymer, at a temperature of 80□ for six hours using a magnetic bar. A second mixed solution was prepared by lowering a temperature of the first mixed solution to room temperature and then mixing and dissolving 15 parts by weight of poly(acrylic acid-maleic acid) (Aldrich, PAM), as a cross-linking agent, with respect to 100 parts by weight of the hydrophilic polymer, with the first mixed solution at room temperature for twelve hours. Also, a hydrophilic coating solution was prepared by adding and mixing 7143 parts by weight of isopropyl alcohol (Duksan Scientific Corp, IPA), with respect to 100 parts by weight of the hydrophilic polymer, with the second solution for two hours. Afterwards, a hydrophilic coating layer was formed on an outer surface of the nanofiber by immersing a fiber web into the prepared hydrophilic coating solution and drying the same at a temperature of 110□ for five minutes.

Also, a non-woven fabric (NamYang Nonwoven Fabric Co., Ltd, CCP40) formed of low melting point composite fiber having an average thickness of 200 μm and a melting point of 120□ and including a sheath portion formed of polyethylene and a core portion formed of polypropylene, was disposed, as a second support, on one surface of the nanofiber web, and then the second support and the nanofiber web were laminated by performing a calendering process by applying heat at a temperature of 140□ and a pressure of 1 kgf/cm$^2$.

Also, two laminates formed by laminating the second support and the nanofiber web were disposed on both sides of the first support to allow the second supports to come into contact with the first support. Here, as the first support, a non-woven fabric (NamYang Nonwoven Fabric Co., Ltd, NP450) formed of low melting point composite fiber having an average thickness of 5 mm and a melting point of about 120□ and including a sheath portion of polyethylene and a core portion of polypropylene was used. Afterwards, a filter medium was manufactured by applying heat at a temperature of 140□ and a pressure of 1 kgf/cm$^2$.

Examples 2 to 5 and Comparative Examples 1 to 6

Filter media as shown in Tables 1 and 2 were manufactured in the same manner as in Example 1 except that a basis weight of a nanofiber web, an average diameter of nanofiber, and the like are changed as shown in Tables 1 and 2.

Experimental Example 1

For a nanofiber web included in each of filter media manufactured according to the Examples and Comparative Examples, the following properties were evaluated and shown in Tables 1 and 2.
1. Elongation Rate
For a nanofiber web included in each of filter media manufactured according to the Examples and Comparative Examples, an elongation rate was measured using a tensile strength tester.
2. Air Permeability
For a nanofiber web included in each of filter media manufactured according to the Examples and Comparative Examples, air permeability was measured using an air permeability tester (TEXTEST).
3. Porosity
For a nanofiber web included in each of filter media manufactured according to the Examples and Comparative Examples, porosity was measured using a capillary flow porometer (PMI).
4. Longitudinal and Transverse Tensile Strengths
For a nanofiber web included in each of filter media manufactured according to the Examples and Comparative Examples, longitudinal tensile strength and transverse tensile strength were measured using a tensile strength tester, and each product of the measured longitudinal tensile strength and transverse tensile strength is shown in the following tables.

Experimental Example 2

Each of filter media manufactured according to the Examples and Comparative Examples, was implemented as a filter unit as shown in FIG. 3A, and following properties were evaluated and shown in Tables 1 and 2.
1. Measurement of Relative Water Permeability
For a filter unit implemented using each of filter media manufactured according to the Examples and Comparative Examples, water permeability per 0.5 m$^2$ of an area of a specimen was measured by applying an operational pressure of 50 kPa, and then water permeability of each of the filter media according to the other embodiments and comparative examples was measured on the basis of water permeability of the filter medium of Example 1 as 100 as a reference.
2. Evaluation of Filtration Efficiency
For a filter unit implemented using each of filter media manufactured according to the Examples and Comparative Examples, a suspension having turbidity of 100 NTU was prepared by dispersing dust to be tested (ISO test dust A2 fine grades) in pure water, and filtration efficiency was measured by measuring turbidities before and after filtration.

3. Evaluation of Durability in Backwashing

For a filter unit implemented using each of filter media manufactured according to the Examples and Comparative Examples, backwashing was performed under conditions in which the filter unit was immersed into water and then water (400 LMH) was pressurized for two minutes per 0.5 m² of an area of a specimen by applying an operational pressure of 50 kPa. Then, durability in backwashing was evaluated as a case in which no abnormalities occur (○) and a case in which any of problems such as delamination of a silver antibacterial layer, delamination between layers, and the like occurs (X).

4. Evaluation of Water Permeability after Backwashing

For a filter unit implemented using each of filter media manufactured according to the Examples and Comparative Examples, backwashing was performed under the above conditions and then water permeability after the backwashing was measured.

5. Evaluation of Filtration Efficiency after Backwashing

For a filter unit implemented using each of filter media manufactured according to the Examples and Comparative Examples, backwashing was performed under the above conditions and then filtration efficiency after the backwashing was measured.

TABLE 1

| Classification | | Example 1 | Example 2 | Example 3 | Example 4 | Example 5 |
|---|---|---|---|---|---|---|
| Nanofiber web | Basis weight (g/m²) | 10 | 7 | 20 | 10 | 10 |
| Nanofiber | Average diameter (nm) | 300 | 300 | 300 | 150 | 400 |
| Evaluation of properties | Elongation rate (%) | 62 | 46 | 69 | 63 | 43 |
| | Air permeability (cfm) | 1.2 | 1.6 | 0.6 | 0.4 | 1.8 |
| | Porosity (%) | 70 | 75 | 55 | 49 | 77 |
| | Product of longitudinal and transverse tensile strengths (kgf/mm²) | 6.2 | 3.7 | 17.2 | 6.5 | 3.1 |
| | Relative water permeability (%) | 100 | 103 | 90 | 84 | 106 |
| | Filtration efficiency (%) | 96 | 94 | 97 | 98 | 91 |
| | Durability in backwashing | ○ | ○ | ○ | ○ | ○ |
| | Water permeability after backwashing (%) | 100 | 103 | 90 | 84 | 106 |
| | Filtration efficiency after backwashing (%) | 96 | 94 | 97 | 98 | 91 |

TABLE 2

| Classification | | Comparative Example 1 | Comparative Example 2 | Comparative Example 3 | Comparative Example 4 | Comparative Example 5 |
|---|---|---|---|---|---|---|
| Nanofiber web | Basis weight (g/m²) | 3 | 35 | 35 | 10 | 3 |
| Nanofiber | Average diameter (nm) | 300 | 300 | 100 | 500 | 500 |
| Evaluation of properties | Elongation rate (%) | 22 | 72 | 70 | 26 | 17 |
| | Air permeability (cfm) | 4.3 | 0.18 | 0.07 | 3.5 | 6.1 |
| | Porosity (%) | 86 | 42 | 32 | 87 | 93 |
| | Product of longitudinal and transverse tensile strengths (kgf/mm²) | 1.7 | 26.3 | 30.1 | 1.9 | 1.1 |
| | Relative water permeability (%) | 121 | 75 | 62 | 112 | 137 |
| | Filtration efficiency (%) | 72 | 95 | 93 | 69 | 44 |
| | Durability in backwashing | X | X | X | ○ | X |
| | Water permeability after backwashing (%) | 131 | 84 | 72 | 112 | 141 |
| | Filtration efficiency after backwashing (%) | 37 | 91 | 73 | 69 | 16 |

As shown in Tables 1 and 2, Examples 1 to 5, which satisfy all of an elongation rate, air permeability, porosity, and a product of longitudinal tensile strength by transverse tensile strength, were excellent in relative water permeability, filtration efficiency, durability in backwashing, water permeability after backwashing, and filtration efficiency after backwashing, in comparison to Comparative Examples 1 to 6 which do not satisfy even any one of them.

Although one embodiment of the present invention has been described above, the concept of the present invention is not limited to the embodiment disclosed herein. Other embodiments may be easily perceived by one of ordinary skill in the art by adding, changing, deleting, adding, and the like a component within an equivalent range of the concept and should be included in the scope of the present invention.

The invention claimed is:

1. A filter medium comprising:
a first support having a plurality of pores;
a nanofiber web disposed on each of the top and bottom of the first support and comprising a poly(vinylidene fluoride) (PVDF) nanofiber which forms a three-dimensional network structure; and
a second support interposed between the first support and the nanofiber web and having a plurality of pores,
wherein the nanofiber has an average diameter of 50 to 450 nm,
wherein the nanofiber is formed with a hydrophilic coating layer on an outer surface, and
wherein the hydrophilic coating layer is formed by crosslinking with 2 to 20 parts by weight of poly(acrylic acid-maleic acid) as a crosslinking agent, based on 100 parts by weight of polyvinyl alcohol (PVA), which is a hydrophilic polymer,
wherein the hydrophilic coating layer includes 2 to 20 parts by weight of poly(acrylic acid-maleic acid) based on 100 parts by weight of PVA,
wherein the nanofiber web has a basis weight of 5 to 10 g/m$^2$,
wherein the nanofiber web satisfies following conditions (1) to (4) which comprise:
(1) an elongation rate of 25% to 69%;
(2) an air permeability of 0.1 to 2.00 cfm;
(3) a porosity of 55% to 85%; and
(4) 3.7≤(tensile strength (kgf/mm$^2$) in a longitudinal direction (MD)×tensile strength (kgf/mm$^2$) in a transverse direction (TD))≤25.

2. The filter medium of claim 1, wherein the nanofiber web has an average pore diameter of 0.1 to 3 μm.

3. The filter medium of claim 1, wherein the first support has a thickness of 90% or more of an overall thickness of the filter medium.

4. The filter medium of claim 1, wherein the first support has a basis weight of 250 to 800 g/m$^2$.

5. The filter medium of claim 1, wherein the first support has a thickness of 2 to 8 mm.

6. The filter medium of claim 1, wherein the first support comprises a first composite fiber which comprises a support component and a low melting point component and is disposed to expose at least a part of the low melting point component at an outer surface, and the first support and the second support are bonded through fusion between the low melting point component of the first composite fiber and a low melting point component of a second composite fiber.

7. The filter medium of claim 1, wherein the second support has a basis weight of 35 to 80 g/m$^2$ and a thickness of 150 to 250 μm.

8. The filter medium of claim 1, wherein the second support comprises a second composite fiber which comprises a support component and a low melting point component and is disposed to expose at least a part of the low melting point component at an outer surface, and the low melting point component of the second composite fiber is fused with the nanofiber web.

9. The filter medium of claim 1, wherein the first support and the second support are any one of a non-woven fabric, a woven fabric, and a knitted fabric.

10. A flat filter unit comprising:
the filter medium according to claim 1; and
a support frame comprising a flow path, through which a filtrate filtered by the filter medium is discharged to the outside, and supporting an edge of the filter medium.

* * * * *